US008170916B1

(12) United States Patent
Dicker et al.

(10) Patent No.: US 8,170,916 B1
(45) Date of Patent: May 1, 2012

(54) RELATED-ITEM TAG SUGGESTIONS

(75) Inventors: Russell A. Dicker, Seattle, WA (US); Waqas Ahmed, Bellevue, WA (US); Aaron D. Wilson, Seattle, WA (US); Scott Allen Mongrain, Seattle, WA (US); Val Dan Dar Ion I. Rosca, Iasi (RO); Florin V. Manolache, Suceava (RO); Valentin Radu Munteanu, Iasi (RO); Corneliu Gabriel Alexandru Rudeanu, Iasi (RO)

(73) Assignee: Amazon Technologies, Inc., Seattle, WA (US)

( * ) Notice: Subject to any disclaimer, the term of this patent is extended or adjusted under 35 U.S.C. 154(b) by 1272 days.

(21) Appl. No.: 11/851,320

(22) Filed: Sep. 6, 2007

(51) Int. Cl.
*Q01C 21/00* (2006.01)
(52) U.S. Cl. ........ 705/26.1
(58) Field of Classification Search ........ 705/26.1, 705/27.1
See application file for complete search history.

(56) References Cited

U.S. PATENT DOCUMENTS 6,618,697 B1 9/2003 Kantrowitz et al.
7,668,821 B1 2/2010 Donsbach et al.
7,676,449 B2 3/2010 Baio et al.
2005/0043939 A1 2/2005 Trower, II et al.
2005/0273724 A1 12/2005 Joeressen et al.
2005/0289124 A1 12/2005 Kaiser et al.
2006/0206454 A1 9/2006 Forstall et al.
2007/0028171 A1 2/2007 MacLaurin
2007/0078832 A1 4/2007 Ott, IV et al.
2007/0174247 A1 7/2007 Xu et al.
2007/0239761 A1 10/2007 Baio et al.
2008/0021898 A1 1/2008 Hoglund
2008/0091572 A1* 4/2008 Kraft et al. ........ 705/27
2008/0114644 A1* 5/2008 Frank et al. ........ 705/14
2008/0228749 A1* 9/2008 Brown ........ 707/5

OTHER PUBLICATIONS

Searchles(R) Launches Searchles TV—The First Video Player to Mashup Multiple Videos from Multiple Sources in One Player With Dynamic Syndication; PR Newswire. New York: Mar. 8, 2007 http://proquest.umi.com/pqdweb?did=1229146181&sid=2&Fmt=3&clientId=19649&RQT=309&VName=PQD.*

* cited by examiner

*Primary Examiner* — Mila Airapetian
(74) *Attorney, Agent, or Firm* — Lee & Hayes, PLLC

(57) ABSTRACT

Tag suggestions enable a hosting entity such as a website to determine one or more tags to suggest to a user for association with a particular item within an electronic catalog. After this determination, the hosting entity may suggest the determined tags to the user. To determine these tags, the hosting entity may employ techniques to determine items related to the particular item. The hosting entity then suggests some or all of the tags associated with the related items. Additionally or alternatively, the hosting entity may determine certain meta-data associated with the particular item. The entity then may suggest this metadata, or some related phrase or tag, to the user for association with the particular item. However the tag suggestions are determined, the hosting entity may rank the tag suggestions to determine which tags to present to the user or to determine an order in which to present the tags.

24 Claims, 5 Drawing Sheets

PROCESSOR(S) 132
MEMORY 134
BROWSER 136
130
104(1)
104(M)
100
CUSTOMERS 102
NETWORK(S) 108
110(1)
110(N)
WEBSITE 106
TAG SUGGESTION ENGINE 120
RELATED ITEM ENGINE 126
ITEM METADATA ENGINE 128
RANKING ENGINE 122
PRESENTATION ENGINE 124
ITEM MANGER 116
ITEM CATALOG 112
114
ITEM 118
TAG 118(1)
TAG 118(2)
TAG 118(P)

RELATED-ITEM TAG SUGGESTIONS

BACKGROUND

Unlike traditional brick-and-mortar businesses, companies utilizing e-commerce websites often do not have a physical store or location where a salesperson can help both novice and knowledgeable customers find sought-after products. Instead, a customer navigating an e-commerce website typically attempts to identify a product that meets the customer's needs. Even a customer with considerable experience navigating e-commerce websites sometimes experiences difficulty in locating a desired product from among hundreds or thousands of offered products. For novice customers, meanwhile, the task of shopping online via the web can be unproductive and even frustrating.

In response to these difficulties, these companies continually strive to make their e-commerce websites more dynamic, compelling, and easier for users to navigate and locate products. To help meet these goals, one recent innovation allows customers to search for a product by tags associated with that product. Tags essentially enable customers, the e-commerce company, or some other entity the ability to easily categorize products. For instance, a customer who has purchased a certain hiking-related book may tag this book as relating to "hiking". When other customers then conduct a future tag search based on "hiking", this book will appear in a returned listing of products. To further the usefulness of these tags, companies utilizing e-commerce websites strive to increase "tag concordance". That is, these companies desire to strengthen an association between a product and certain tags already associated with that product and whose association appears to be particularly good. In addition to increasing concordance, these companies also strive to increase tag coverage. That is, these companies desire to increase tagging of products that have none or very few associated tags.

Accordingly, among other potential improvements, there remains a need for improving tag concordance and tag coverage for products and other elements on an e-commerce website.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
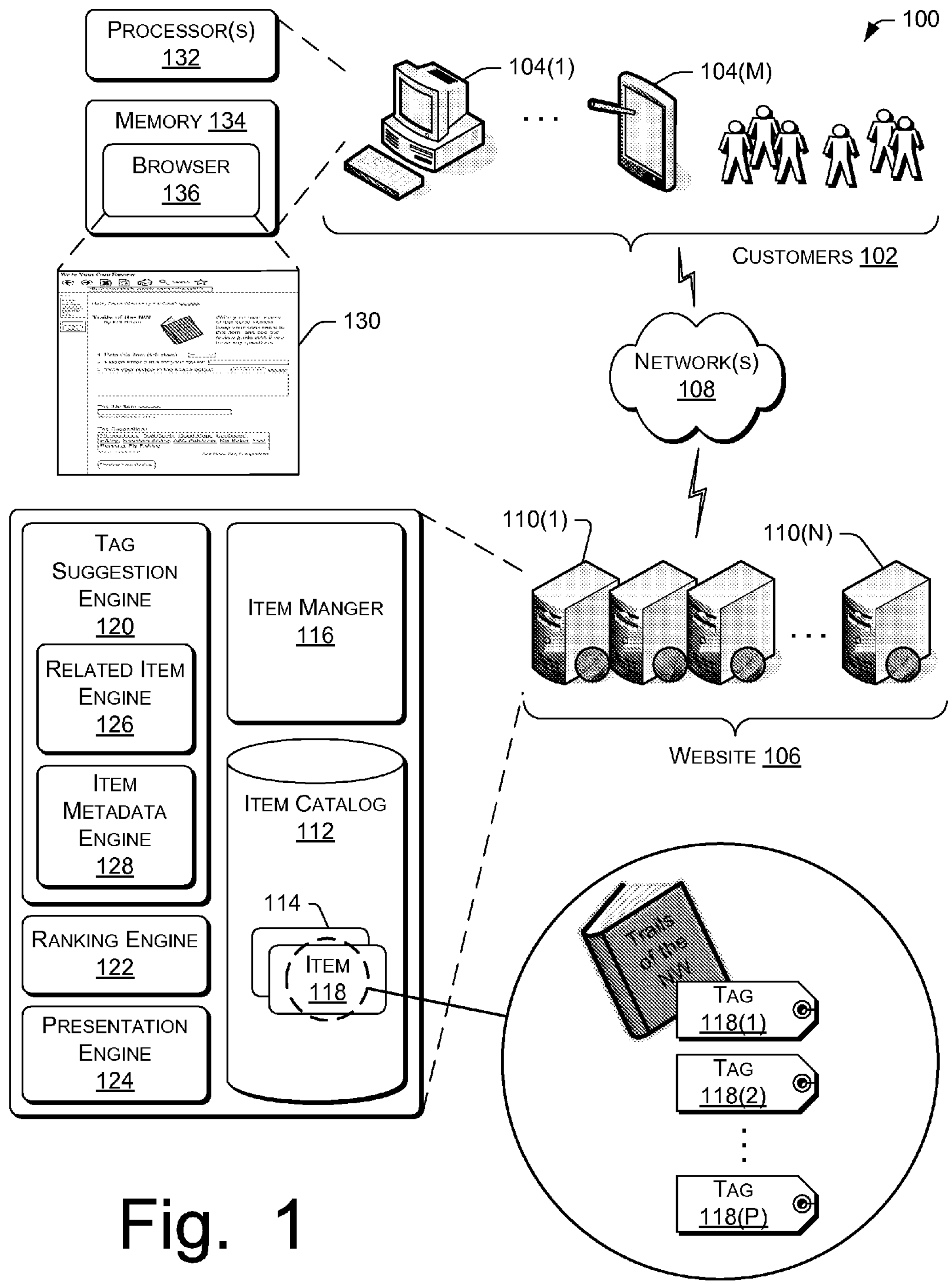
FIG. 1 is a schematic diagram of an illustrative architecture for implementing tag suggestions for items within an electronic catalog. The network environment includes multiple clients coupled via a network to a server system that hosts the electronic catalog.

Embodiments of the present disclosure are directed to, among others, tag suggestions for elements within an electronic catalog and made available over the Internet. As an overview, elements may be a product, a service, a sellable unit, a user profile, customer-created content (e.g., artwork), or anything else to which a tag may be associated. Tagging, meanwhile, enables a community of users or other entities to define and assign different tags to the elements. Tags are user-generated metadata about the elements. In other words, tags are pieces of information separate from, but related to, the elements. In a collaborative environment, the tags are descriptors that may be freely chosen by different users to characterize or otherwise describe attributes of the elements, rather than having the description controlled by a centralized classification process. With this freedom, the tags can specify properties of an element that may not otherwise be obvious from the element itself and/or which may have special meaning only to the user or a subset of users. Once assigned to elements, the tags may then be used to locate the elements via a tag search. Although embodiments are described as having alpha-numeric tags, other types of tags can be used, including icons, photos, and/or video clips.

An entity that hosts the electronic catalog and the elements therein, meanwhile, may suggest one or more tags for a user to associate with a particular element. This entity, such as a website, presents these suggested tags on a page that is associated with the particular element and which the user views. For instance, the hosting entity may suggest these tags while the user views a detail page about the element, a review page for the element, a search results page including the element, or any other page associated with the element. If the user wishes, the user then selects one or more of these suggested tags to associate the selected tags with the particular item.

The hosting entity may compile a collection of suggested tags in multiple ways. For instance, the hosting entity may discover metadata about the element and may suggest the metadata as a tag to be applied to the element. The hosting entity may also determine tags or other phrases that are related to this metadata and suggest these related tags or phrases. The hosting entity may also compile tag suggestions based on the element's relationship to one or more other elements in the electronic catalog or in another catalog. Here, the hosting entity first determines that the particular element is somehow related to the other elements. The hosting entity then discovers the tags associated with these other elements and suggests the tags for association with the particular element. In addition, the hosting entity may suggest metadata about the related elements as a tag for the particular element, or may leverage the elements' relationship in multiple other ways. For instance, the hosting entity may determine elements that are related to the related elements, as so on.

After compiling the collection of suggested tags, the hosting entity then presents some or all of the tags to enable the viewing user to associate one or more of the tags with the particular element. In some instances, the hosting entity ranks the suggested tags and presents a subset of these ranked tags. When the hosting entity generates or receives tag suggestions from multiple sources (e.g., element-metadata sources and related-element sources), the hosting entity may weigh the sources. These assigned weights help determine which suggested tags the hosting entity presents to the user, or in which order the suggested tags appear. In some instances, tags already associated with the particular element compete against the suggested tags. Here, the hosting entity may value tags already associated with the particular element more than suggested tags. As such, the hosting entity gives these tags a weight that is greater relative to the suggested tags. The hosting entity then computes a score for each of the associated tags and the suggested tags, and presents some number of these tags to the user for association or re-association with the particular element.

For purposes of discussion, tag suggestions are described in the context of an item catalog hosted by a merchant website. One illustrative implementation of this environment is provided below. However, it should be appreciated that the described tag-suggestion techniques may be implemented in other environments.

Illustrative System Architecture

FIG. 1 depicts an illustrative architecture 100 in which tag suggestions may be implemented. In architecture 100, one or more customers 102 may utilize user computing devices 104 (1), . . . , 104(M) to access a website 106 via a network 108. Network 108 represents any one or combination of multiple different types of networks, such as cable networks, the Internet, and wireless networks.

One or more servers 110(1), . . . , 110(N), perhaps arranged in a cluster or as a server farm, host website 106. Other server architectures may also be used to host the site. Website 106 is capable of handling requests from many users and serving, in response, various web pages that can be rendered at user computing devices 104(1)-(M). Website 106 can be any type of website that supports user interaction, including online retailers, informational sites, social networking sites, blog sites, search engine sites, news and entertainment sites, and so forth.

In the illustrative environment, website 106 represents a merchant website that hosts an electronic catalog with one or more items. An item includes anything that the merchant wishes to offer for purchase, rental, subscription, viewing, informative purposes, or some other form of consumption. In some embodiments the item may be offered for consumption by the merchant. However, in some embodiments the merchant may host items that others are selling using the merchant's website. An item can include a product, a service, a digital download, a news clip, customer-created content, information, or some other type of sellable or non-sellable unit.

In FIG. 1, the electronic catalog is represented as an item catalog 112, which stores a collection of item records 114. Item catalog 112 is accessible, directly or indirectly, by one or more of servers 110(1)-(N). Each item record 114, meanwhile, represents an associated item being offered for sale on website 106 and contains information about the associated item. For products such as books or music CDs, for example, the item record may contain a description, images of the product, author/artist names, publication data, pricing, shipping information, and so forth. For other types of items, the item record may contain different information appropriate for those items. Hereafter, the term "item" may be used interchangeably with the term "item record".

An item manager 116 facilitates access to and management of item records 114 in item catalog 112. Item manager 116 allows the website operators to add or remove items to or from item catalog 112, and generally maintain control of the items offered on website 106. When a user requests information on an item from website 106, one or more of servers 110(1)-(N) retrieve the item information from item catalog 112 and serve a web page containing the information to the requesting user computing device. Item catalog 112 may therefore contain static web pages that are pre-generated and stored prior to such requests, or may alternatively store data that is used to populate dynamic web pages that are generated in response to such requests.

In addition, each item record 114 within item catalog 112 may be associated with one or more tags. For instance, an illustrative item record 118 (illustrated as representing a book) is shown to be associated with tags 118(1), . . . , (P). Customers 102, an operator of website 106, or some other entity may have associated tags 118(1)-(P) with item record 118. By associating a tag with an item record, the tag also becomes associated with the item that the item record represents. As discussed above, tags 118(1)-(P) may comprise pieces of information that characterize or otherwise describe attributes of the item represented by item record 118. In some embodiments, tags may also include information that does not describe attributes of the item. For example, a user may tag an item "Mom" to indicate items that might be a good gift for the user's mother.

FIG. 1 also depicts that servers 110(1)-(N) include or have access to a tag suggestion engine 120, a ranking engine 122, and a presentation engine 124. Tag suggestion engine 120, which includes a related item engine 126 and an item metadata engine 128, determines tags to suggest to a user (e.g., one of customers 102) of website 106 when the user views a page associated with a particular item within item catalog 112.

Related item engine 126 determines items within item catalog 112 that are related to the particular item. This engine determines this relatedness in multiple ways, as described in detail below. Once this engine determines the related items, the engine then determines one or more tags associated with the related items or metadata associated with the related items. Tag suggestion engine 120 may then suggest one or more of these tags and/or the metadata for association with the particular item. Item metadata engine 128, meanwhile, determines metadata about the particular item. This metadata may include a manufacturer, specifications, a publisher, and multiple other pieces of information, such as those described below. Tag suggestion engine 120 may then suggest some or all of this metadata, or tags or phrases related to this metadata, for association with the particular item.

Once tag suggestion engine 120 determines one or more tag suggestions, ranking engine 122 ranks the suggestions to determine which suggestions to present to the user and/or to determine an order in which to present the suggestions. To rank these suggestions, ranking engine 122 may assign weights to the tag suggestions based, at least in part, on a source of each suggestion. For instance, ranking engine 122 may exhibit a preference for certain sources (e.g., certain suggestions from related item engine 126) and may accordingly value these sources more than less-preferred sources (e.g., certain suggestions from item metadata engine 128).

Additionally, ranking engine 122 may rank tags that have already been associated with the particular item. Again, these already-associated tags may be assigned a weight. In some instances, these tags are preferred over tag suggestions that have not previously been associated with the particular item. As such, ranking engine 122 may assign a greater weight to the associated tags relative to the non-associated tag suggestions.

Presentation engine 124 receives the rankings from ranking engine 122 and presents some or all of the tag suggestions to the user. Depending on the returned rank, presentation engine 124 may present tags that have already been associated with the particular item along with tag suggestions that have not been so associated. Once the tag suggestions are presented to the user, the user may or may not choose to associate or re-associate one or more of the suggestions with the particular item.

As discussed above, one or more of customers 102 may access web pages on website 106 that include a particular item, such as a web page 130. Presentation engine 124 may present to the user tag suggestions for the particular item on one or more of these web pages. From these pages, the user may choose to associate one or more of the tag suggestions with the particular item. To access the web pages that website 106 hosts, customers 102 may utilize user computing devices 104(1)-(M) (also referred to as "client computers" or simply "clients"). User computing devices 104(1)-(M) may be implemented as any number of computing devices, including a personal computer, a laptop computer, a portable digital assistant (PDA), a mobile phone, a set-top box, a game console, and so forth. As illustrated, each user computing device is equipped with one or more processors 132 and memory 134 to store applications and data. According to some embodiments, a browser application 136 is shown stored in memory 134 and executes on a processor 132 to provide access to website 106. Browser 136 renders web pages served by website 106 on an associated display. In addition to a user navigating via browser 136, other software applications (browsers or otherwise) could likewise operate to receive and present web page 130. Note also that while the above embodiments are described in the context of a web-based system, other types of client/server-based communications and associated application logic could be used.

When a user (e.g., one of customers 102) accesses website 106, user computing device 104(1) submits a request, such as in the form of a uniform resource locator (URL), to servers 110(1)-(N). Upon receiving the request, servers 110(1)-(N) return web page 130 back to the requesting client computer in the illustrated implementation. In the context of a merchant website, returned web page 130 may include a particular item such as item record 118 and may present to the user one or more tag suggestions. Web page 130 may then allow the user to select one or more of these suggestions for association with the book represented by item record 118, as described in detail below with reference to FIGS. 2-3.

Illustrative Tae Suggestions

Figure 2:
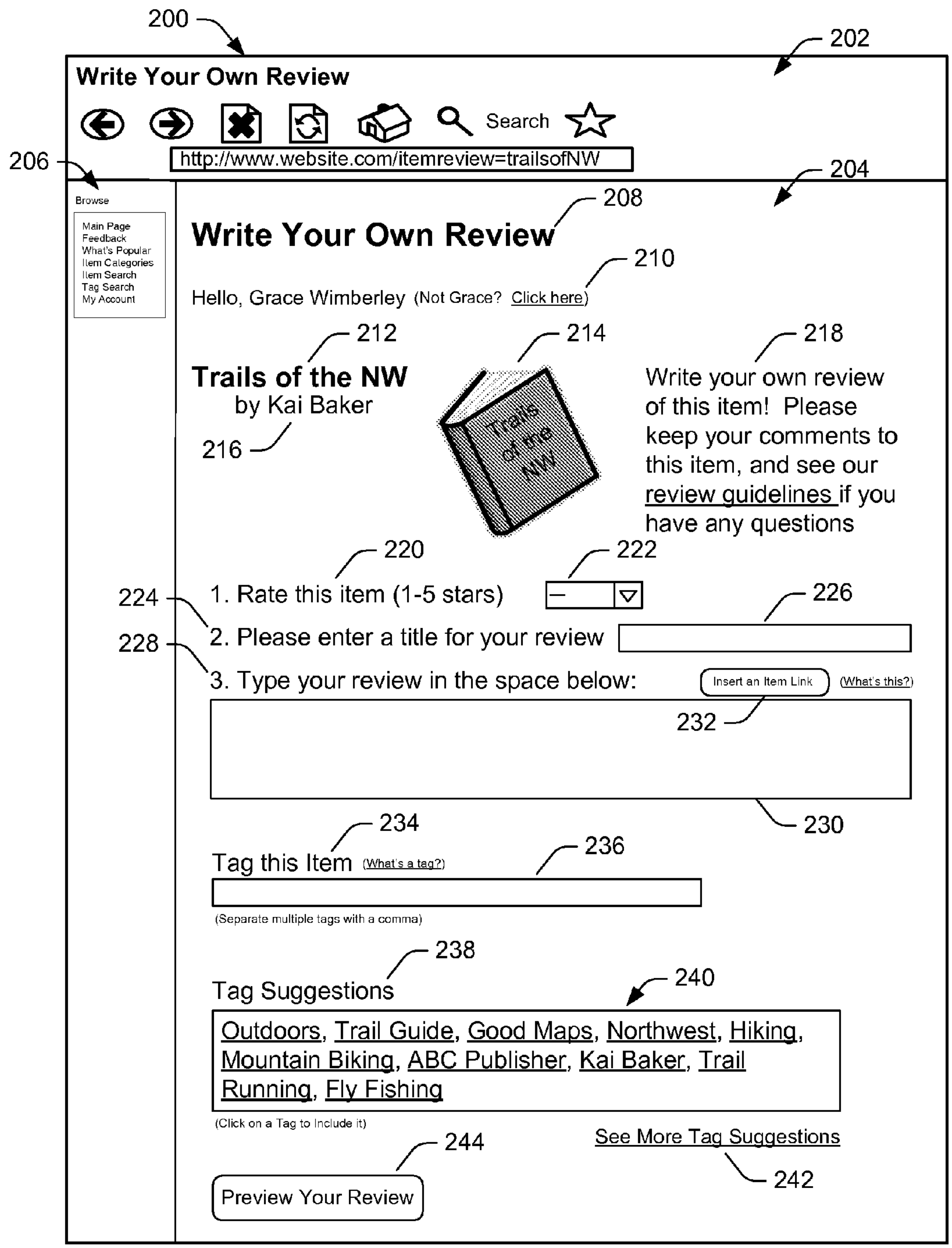
FIG. 2 is a screen rendering of an illustrative item review page for an item within the electronic catalog. As illustrated, this item review page suggests multiple tags for a viewing user to associate with the item.

FIG. 2 illustrates a screen rendering of an illustrative item review page 200 for item 118 within item catalog 112. As illustrated and described below, this item review page suggests multiple tags for a user to associate with the item. While FIG. 2 illustrates these tag suggestions with reference to an item review page, multiple other pages served by website 106 may include these tag suggestions. These pages may include, without limitation, item detail pages, search results pages, category pages, and any other page that pertains to item 118.

As illustrated, page 200 first includes a browser toolbar 202 and a content area 204. Browser toolbar 202 enables a user of the merchant website to navigate to pages of the website such as item review page 200. Content area 204, meanwhile, includes a menu 206, a title 208, and a greeting 210. Menu 206 includes multiple links to web pages hosted and served by the merchant website. Title 208 entitles page 200 as "Write Your Own Review". Greeting 210, meanwhile, identifies the user ("Grace Wimberely") currently signed in to offer a review of item 118.

Content area 204 also identifies item 118, here with use of a title 212 of the book, an illustration 214, and a name of the author 216. Other item review pages may include more or less metadata about an item, and may include differing metadata appropriate for that item. An item review page for a mountain bike, for instance, may include a manufacturer' name, detailed specifications, a size, and the like. Returning to item review page 200, title 212 entitles item 118 as "Trails of the Northwest (NW)", while name 216 shows the author as "Kai Baker". Additionally, content area 204 includes information 218 about the review process and includes a hyperlink to a page containing "review guidelines".

To review item 118 in the illustrated implementation, the user "rates the item" within a first review area 220 by selecting a number of stars from a drop-down box 222. If the user greatly enjoys the book, for instance, the user may choose the five-star rating from drop-down box 222. A second review area 224 allows the user to enter a title for the user's review in a text box 226. For instance, the user may entitle the review: "A Must-Read Book for Serious Hikers and Mountain Bikers in the NW!" Finally, a third review area 228 allows the user to type in the user's actual review within a text box 230.

When the user types her review into text box 230, the user may associate item 118 with another item within item catalog 112 by, for instance, comparing the two items. The user may so associate these items by including a picture of the other item within text box 230 or by actuating an icon 232 entitled "Insert an Item Link". Actuation of icon 232 enables the user to insert, within the text of the user's item review, a link to a page associated with the other item, such as an item detail page. By associating item 118 with another item within the review, tag suggestion engine 120, and more particularly related item engine 126, may deem the items as related for purposes of determining tag suggestions.

Content area 204 of item review page 200 further includes a mechanism 234 to enable the reviewing user to associate one or more tags with item 118. Mechanism 234 here includes a text box 236, in which the user may type any sort of tag that the user wishes to associate with the illustrated book. Again, while these tags are described as pieces of text, in other implementations tags may employ icons, photos, video clips, or any other piece of information that a user may employ to provide a description of the item or anything else.

Item review page 200 also incorporates an area 238 containing a list 240 of multiple tag suggestions that the merchant website suggests to the reviewing user. Here, the merchant website determines (via tag suggestion engine 120) a number of phrases and/or tags already existing within item catalog 112 to suggest as tags for illustrated item 118. Tag suggestion engine 120 may determine these tag suggestions by determining items in item catalog 112 (or, in some instances, outside of item catalog 112) related to item 118 and/or by determining certain metadata about item 118 itself. In the former instances, the engine pulls tags from the related items (and potentially related tags) for possible use as tag suggestions for item 118. In the latter instances, the engine stores the metadata about the item, as well as related tags and phrases, as potential tag suggestions.

Once the website determines these suggestions, the website may rank (via ranking engine 122) the tag suggestions to determine which to present (via presentation engine 124) to the user and/or to determine an order in which to present them. Here, presentation engine 124 presents the top suggestions together in a single box. The engine, however, may also present the suggestions, in a ranked list, or may indicate a rank in other ways. For example, the suggestions may be arranged in a cloud or other grouping with suggestions having higher ranks being shown in increasing fonts, boldness, or contrasting color.

Additionally, the website may also rank tags already associated with item 118. Here, the website presents ten tag suggestions, beginning with "Outdoors" and ending with "Fly Fishing". Note that some of these tag suggestions may have already been associated with item 118 as a tag while others may not have been so associated. In fact, while some of these ten tag suggestions may be tags associated with other items, some of the tag suggestions may also include phrases that have yet to be tagged to any item within item catalog 112. A section below, entitled "Illustrative System Components", describes in detail the determination, ranking, and presentation of tag suggestions.

A link 242 entitled "See More Tag Suggestions" is adjacent area 238 and list 240. When actuated, link 242 enables the user to view additional tag suggestions for item 118 in instances where presentation engine 124 presents only a portion of the determined suggestions. Additionally, item review page 200 includes an icon 244 entitled "Preview Your Review" that, when actuated, allows the user an opportunity to preview her review before submitting the review to website 106. Once the user previews and submits her review, any tags manually entered into text box 236 or selected via tag-suggestions list 240 becomes associated (or re-associated) with item 118.

Figure 3:
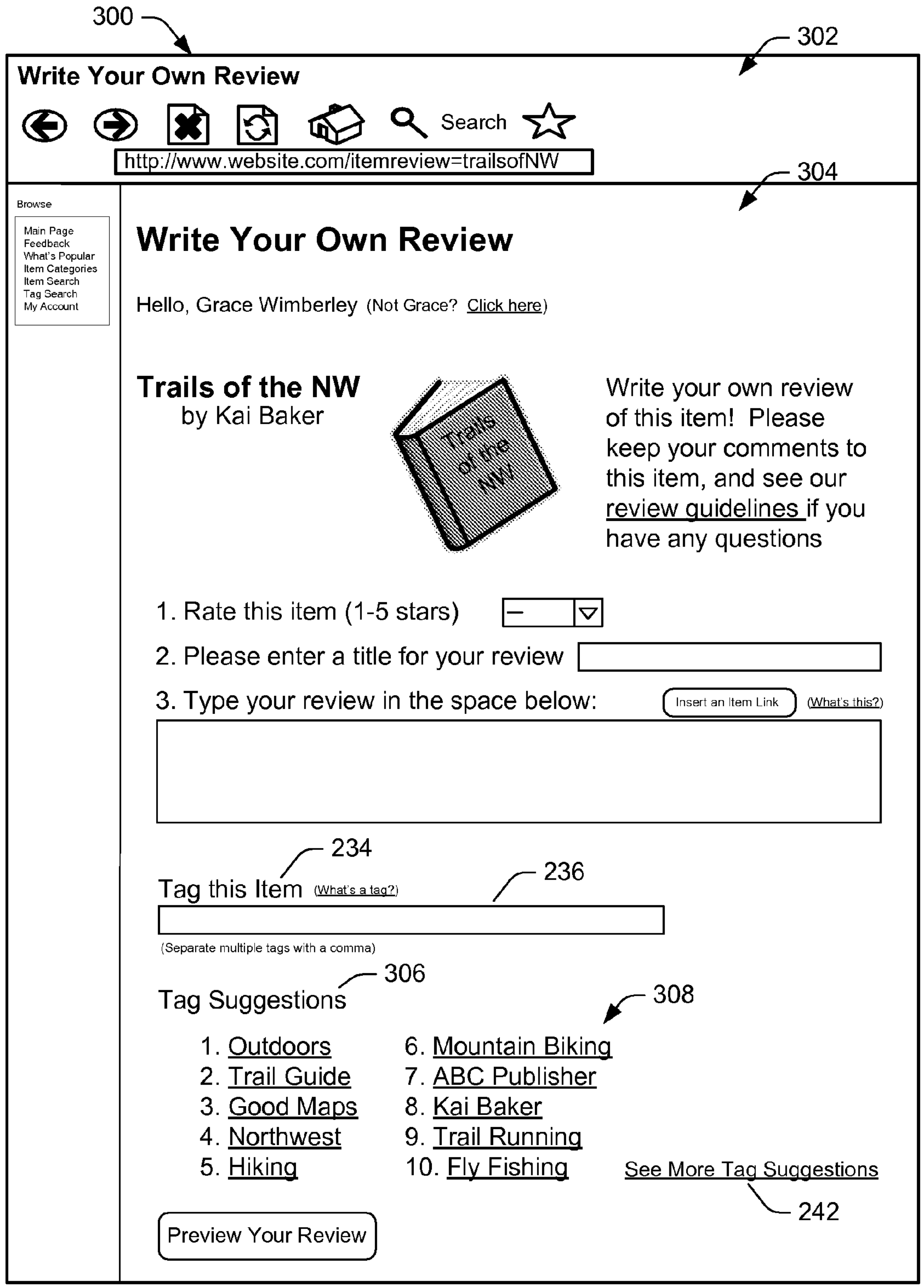
FIG. 3 is a screen rendering of another illustrative item review page for the item within the electronic catalog. Here, the tag suggestions appear in a ranked order.

FIG. 3 illustrates a screen rendering of another illustrative item review page 300 for item 118. Similar to page 200, item review page 300 includes a browser toolbar 302 and a content area 304. Similar to content area 204, content area 304 includes mechanism 234 and text box 236 to enable the user to associate tags with item 118. Here, however, content area 304 includes an area 306 containing a list 308 of tag suggestions in a ranked order. That is, presentation engine 124 presents the determined tag suggestions in an order determined by ranking engine 122. Here, the ranking engine ranked "Outdoors" the highest for item 118, and this suggestion accordingly appears first within list 308. Again, in instances where more tag suggestions exist (e.g., more than ten), the user may actuate link 242 to "See More Tag Suggestions".

Illustrative System Components

Figure 4:
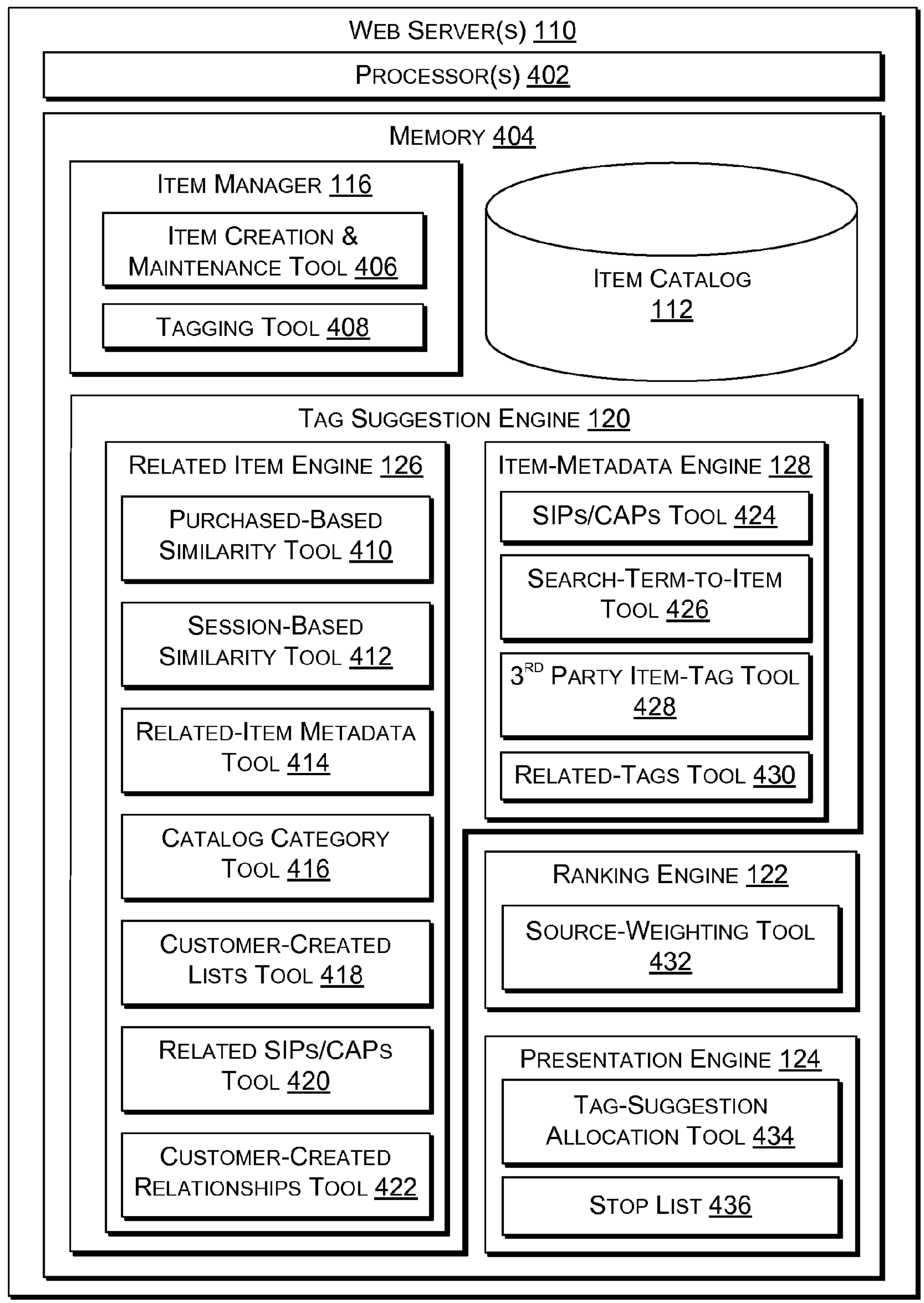
FIG. 4 is a block diagram illustrating embodiments of modules in an item manager, tag suggestion engine, ranking engine, and presentation engine from FIG. 1.

FIG. 4 illustrates example implementations of components of a tag-suggestion system, including components of presentation engine 120, ranking engine 122, and presentation engine 124. These engines and their components run as software on one or more of web servers 110(1)-(N). The web servers have processing capabilities and memory suitable to store and execute computer-executable instructions. In this example, web server(s) 110 include one or more processors 402 and memory 404. Memory 404 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Item manager 116 and engines 120-124 are implemented as software or computer-executable instructions stored in memory 404 and executed by one or more processors 402. First, item manager 116 includes an item creation and maintenance tool 406 to facilitate creation and maintenance of item records 114 in item catalog 112. Such items may be created and posted by the website operator (e.g., an owner of a merchant website), the manufacturer, distributor, retailer, or the like. Item manager 116 further includes a tagging tool 408 that enables a user (e.g., one of customers 102) to associate one or more tags with an item within item catalog 112. Tagging tool 408 may also enable the user to first define one or more of these tags.

Tag suggestion engine 120, meanwhile, includes a multitude of modules within related item engine 126 and item metadata engine 128. With use of one or more of the illustrated modules or one or more non-illustrated modules, tag suggestion engine 120 determines one or more tags to suggest to a user for association with a particular item in item catalog 112.

To begin, related item engine 126 functions to determine, for the particular item, one or more other items that are related to the particular item. Once related item engine 126 determines these related items, the engine pulls one or more tags associated with the related items to suggest these as tags for the particular item. In addition, the related item engine may determine other tags related to the tags associated with related items. Again, the engine may determine these other related tags in order to suggest the other related tags for association with the particular item. Similarly, related item engine 126 could determine items that are related to the related items and may pull and suggest tags associated with these items, and so on and so forth.

Related item engine 126 may employ multiple modules to determine that items are related in the illustrated implementation, a sampling of which are illustrated and described below. It is specifically noted, however, that related item engine 126 may include multiple other modules to determine item relationships.

As illustrated, related item engine 126 includes a purchase-based similarity tool 410, a session-based similarity tool 412, a related-item metadata tool 414, a catalog category tool 416, a customer-created lists tool 418, a related SIPs/CAPs tool 420, and a customer-created relationships tool 422. Each of these tools may act singularly or in any combination to determine items related to any particular item within item catalog 112. Each of these illustrative tools and their functionalities will be addressed in order.

First, purchased-based similarity tool 410 determines, for purchasers that have previously purchased a particular item such as item 118 illustrated in FIGS. 1-3, other items within item catalog 112 that the purchasers also purchased. For instance, imagine that one of customers 102 has previously purchased (e.g., from website 106 or possibly from another source) the book entitled "Trails of the Northwest". Imagine also that this customer also purchased three other books. Purchased-based similarity tool 410 therefore reports that item 118 is related to these three books. As such, tag suggestion engine 120 may determine the tags associated with these books for possible use as tag suggestions for item 118, the book entitled "Trails of the Northwest". Furthermore, Purchased-based similarity tool 410 may determine related items in this manner for each of customers 102 that purchased a particular item.

Session-based similarity tool 412, meanwhile, tracks the items that a user views in a same session that the user views a particular item, such as item 118. For instance, imagine that one of customers 102 views item 118 in a particular session of navigating website 106. Tool 412 then determines the other items the customer also viewed during that session. After making this determination, session-based similarity tool 412 deems some or all of these viewed items as related to item 118. The term "session", meanwhile, generally corresponds to a period of time between which the customer viewed items within item catalog 112. This time frame may be a set time frame (e.g., thirty minutes) or may vary with, for instance, a category of the particular item among other factors. Also, a session may begin when the customer views the particular item, or may span on either side of the time at which the customer views the particular item. Finally, note that tool 412 may determine related items in this manner for each of customers 102.

Related-item metadata tool 414 examines metadata associated with a particular item and, with the determined metadata, determines one or more related items within item catalog 112. That is, tool 414 seeks items within item catalog 112 that also contain or are related to the determined metadata. This metadata may include any information about a particular item, such as a book's author, publisher, a series to which the book belongs, or the like. Again, this metadata will vary with differing items. For instance, tool 414 may examine item 118 and determine that the name of the book's author is Kai Baker. Tool 414 then examines items 114 within item catalog 112 to determine other books or items written by Kai Baker. Responsive to finding one or more such books, tool 414 considers the found books as related to item 118. Additionally, tool 414 may use this author information in other ways to find related items. For instance, if Kai Baker is known to write in a same genre as an author Braden Brattebo, then books written by this latter author may be determined to be related to item 118 in some instances. Again, once tool 414 deems items as related, tags (or related tags) may be used as tag suggestions for item 118.

Next, catalog category tool 416 determines related items with reference to a particular item's category and/or subcategories within item catalog 112. Once tool 416 determines this category and/or sub-categories, tool 416 deems some or all of the other items within the category or sub-category as related. With reference again to item 118, imagine that item catalog 112 classifies this book within a sub-category entitled "United States Hiking". Tool 416 learns this information and then deems some or all of the other items within this subcategory as related to item 118.

Customer-created lists tool 418, meanwhile, determines related items by examining or determining information associated with customer-created lists stored on or accessible by website 106. These lists may include, for instance, a particular customer's wish list, the particular customer's "favorite books of 2007", or any other customer-created list. Tool 418 examines one or more lists that include, for instance, item 118. Tool 418 then determines other items resident on these one or more lists and deems some or all of these other items as related to item 118. Again, tags associated with these other items may then be suggested as tags for item 118.

Next, related-item engine 126 includes related SIPs/CAPs tool 420. Tool 420 examines a corpus of text associated with a particular item to determine of the corpus contains a "statistically improbable phase" (SIP). This tool may also determine if the corpus includes a "capitalized phrase" (CAP) more than a threshold number of times. The examined corpus may include contents of an item (e.g., the book itself), a customer or critic review, a manufacturer's description, or any other text associated with a particular item. Tool 420 typically examines this corpus by digitally scanning the corpus.

A SIP, meanwhile, is a phrase that appears within the corpus more often than would be statistically expected. For instance, if a phrase such as "the man walked the blue dog" appears in the corpus with surprising frequency, then this phrase may be considered a SIP. Related SIPs/CAPs tool 420 then examines other corpuses associated with items 114 in item catalog 112 to determine the same or a related SIP. Responsive to finding a same (or in some instances a related) SIP, tool 420 deems that corresponding item and the particular item to be related. Note that in some instances, certain common phrases are excluded from the SIP analysis.

A capitalized phrase, meanwhile, is a phrase in which each of the words that make up the phrase is capitalized (e.g., "New York City"). Again, tool 420 digitally scans one or more corpuses of text associated within a particular item to determine if any of the corpuses contain a CAP more than a threshold number of times (e.g., a number of times that is statistically improbable, or the like). If tool 420 determines that a corpus does contain a CAP more than the threshold number of times, then tool 420 scans corpuses of text associated with other items. If any of these corpuses similarly contain the CAP (or a related tag or phrase such as "NYC") more than the threshold number of times, then tool 420 considers the corresponding item and the particular item as related.

Next, customer-created relationships tool 422 references customer-created relationships to deem items within item catalog 112 as related. Tool 422 may examine any relationship created by users of web site 106 to determine these related items. For instance, tool 422 may examine a customer's or critic's review of the book entitled "Trails of the Northwest" (i.e., item 118) to determine if the review somehow relates this book to one or more other items. For instance, if a customer's review contains a link to another item's item detail page, then tool 422 may deem this item and item 118 related. Similarly, if the customer review includes a picture or other metadata of another item within the review, then tool 422 may consider this item and item 118 related. By determining this relationship, tag suggestion engine 120 may pull the tags or related tags associated with the related items to suggest as tags for item 118.

Tag Suggestion engine 120 further includes item-metadata engine 128 to assist in determining tag suggestions for items within item catalog 112. Item-metadata engine 128 determines metadata about a particular item in order to suggest this metadata and/or related tags or phrases as a tag for the particular item. This engine 128 may determine any sort of metadata about the particular item to suggest as tags. For instance, this metadata may include an item's publisher, manufacture, title, author, or any other information appropriate for the particular item. FIGS. 2-3, for instance, include a tag suggestion of "Kai Baker" for item 118, as Kai Baker is the author of the illustrated book.

In addition, illustrative item-metadata engine 128 may include multiple modules to determine certain other types of metadata. As illustrated, engine 128 includes a SIPs/CAPs tool 424, a search-term-to-item tool 426, a third party item-tag tool 428, and a related tags tool 430.

Similar to related SIPs/CAPs tool 420, SIPs/CAPs tool 424 examines a corpus of text associated with a particular item. As such, these two tools may be the same or separate tools. Whatever the structure, the scanned corpus may again include the item's actual body (e.g., the book), a customer or critic review, a manufacturer's description, or the like. Responsive to determine a SIP or a CAP, SIPs/CAPs tool 424 stores the SIP or CAP (and possibly any related tags or phrases), as a possible tag suggestion for the particular item.

Next, search-term-to-item tool 426 determines a search term that a user employed to discover a particular item. For instance, imagine that a user conducts a search using the search term "hiking". After conducting the search, the user then selects (e.g., from a search results page) a link to a page associated with item 118 such as an item detail page. Tool 426 may determine that the search term "hiking" was used to navigate to the item 118 and, as such, may store this search term as a possible tag suggestion for item 118. Additionally, tags or phrases related to "hiking" may also be suggested. Note that in some instances, search-term-to-item tool 426 may suggest "hiking" or related tags or phrases in instances where the search actually led to the user purchasing the particular item in addition to navigating to the item.

In some instances, the user conducts this search on website 106. For instance, the user could directly search item catalog 112 for items related to "hiking". In other instances, however, the user could search via a third party, such as a third party search engine. Here, the user may select a link to the page associated with the item from a search results page returned by the search engine. Tool 426 therefore receives the search term employed by the user from the third party search engine. In either of these instances, tool 426 may employ this search term as a tag suggestion for the particular item.

Third party item-tag tool 428, meanwhile, determines tags associated with a particular item at entities other than website 106. For instance, tool 428 may crawl a third party website to determine tags associated with a particular item at the third party website. This tool may also receive these tags in other ways, such as by purchasing the information from the third party website.

Finally, related-tags tool 430 examines a tag associated with a particular item to determine related tags. For instance, tool 430 may, after discovering the tag associated with the particular item, look in item catalog 112 for other items similarly tagged. Tool 430 then pulls these tags and/or related tags to suggest as tags for the particular item. Note that tool 430 may be of particular use in instances where the particular item is associated with a single or very few tags.

While a few illustrative modules have been illustrated, item-metadata engine 128 may include additional modules to determine other metadata for use as a tag suggestion. For instance, another module may determine a category and/or sub-category to which a particular item belongs and may suggest the category and/or the sub-category as a tag. Additionally, yet another module may receive tag suggestions via suggestions from a community of users. That is, this module may distribute information about an item (e.g., an illustration and description of the item) over a network to the community in order to elicit suggestions from the community. The community's output is then suggested as a tag. In some instances, website 106 compensates one or more users of the community in response to the users' output.

In addition to the item manager and the tag suggestion engine, memory 404 includes ranking engine 122 and presentation engine 124. Ranking engine 122 receives, from tag suggestion engine 120, tag suggestions for one or more particular items within item catalog 112. Ranking engine 122 then ranks these tag suggestions according to a one or more of factors. Presentation engine 122 then receives and employs these ranks in determining which or how (e.g., in what order) to list the ranked tag suggestions. To rank the tag suggestions determined for a particular, in one embodiment ranking engine 122 first determines, possibly via the methods above, which of items 114 is related to the particular item. Ranking engine 122 then takes the determined tag suggestions and counts, for each tag suggestion, a number of times that the tag suggestion has been associated with the related items. The engine then ranks these tag suggestions from highest to lowest based on this count.

For instance, imagine that item 118 has thirty-three related items and that tag suggestion "outdoors" has been associated with these thirty-three items 104 times. "Trail guide", meanwhile has been associated with these items 100 times. As such, ranking engine would rank "outdoors" ahead of "trail guide" in terms of a tag suggestion for item 118.

In instances where strengths of a relationship between the particular item and one or more related items are known, these relationship strengths may be taken into account when summing the number of tag suggestions associated with the related items. As illustrated, ranking engine 122 includes a source-weighting tool 432. In the above example, tool 432 may be employed to give relatively high weights to a count of tag suggestions associated with a related item that has a particularly strong relationship with the particular item. Conversely, if the particular item weakly relates to another related item, a tag count may be weighted relatively low. In some instances, purchase-based similarity tool 412 determines, in whole or in part, these relationship strengths. That is, if a certain related item has been oft-purchased by users who purchase the particular item, then the corresponding relationship may be deemed relatively strong.

In instances where a tag count between two or more tag suggestions is relatively close, ranking engine 122 may examine, for each tag suggestion, the number of items or the total number of times that the tag suggestion is used. Presentation engine 124 may then choose the more generally popular tag for display as a tag suggestion over the less popular tag suggestion. Additionally or alternatively, presentation engine 124 may merely rotate in and out the similarly-ranked tag suggestions, or could display the tag suggestion most recently applied generally or to the particular item. Note also that ranking engine 122 may employ this process for determining initial ranks. That is, for each tag suggestion the ranking engine may determine the number of items tagged or the total number of times that the tag suggestion is used. The engine then ranks the tag suggestions according to this count.

Additionally or alternatively, ranking engine 122 may employ source-weighting tool 432 to weight one or more sources of tag suggestions. For instance, imagine that tag suggestion engine 120 determines tag suggestions by employing each of the modules illustrated in FIG. 4. Here, source-weighting tool 432 may then assign weights to each source and, more particularly, to each tag suggestion generated by each source. For instance, source-weighting tool 432 may assign weights to tag suggestions generated by purchased-based similarity tool 410 that are high relative to tag suggestions generated by customer-created lists tool 418. In some instances, these assigned weights vary for different items according to a type or category of the items. For instance, purchased-based similarity suggestions may be very helpful for books, but not as helpful for movies. As such, tag suggestions generated by purchased-based similarity tool 410 may be weighted rather heavily for a particular book, while being weighted much less heavily for a particular movie.

In addition to ranking tag suggestions for a particular item, ranking engine 122 may ranks tags that have already been associated with the particular item. These already-associated tags may be ranked alongside with the tag suggestions, or separately from the tag suggestions. In the former instances, the already-associated tags may be ranked in the same manner as tag suggestions. That is, a count of a number of times that each of these tags has been associated with related items may be compared with the tag suggestions. Here, ranking engine 122 may exhibit a preference for tags that have already been associated with the particular item. As such, source-weighting tool 432 may assign a relatively high weight to some or all tags already associated with the item.

Once ranking engine 122 has ranked the tag suggestions and the tags already-associated with the particular item, presentation engine 124 receives the rankings and, in response, presents one or more tag suggestions to the user. In some instances, presentation engine 124 presents a portion of the received tag suggestions and/or lists the tag suggestions in a particular order based at least in part due to the rankings. For instance, presentation engine 124 may only list a certain number of tag suggestions, such as ten as illustrated in FIGS.

2-3. Additionally or alternatively, presentation engine 124 may list the tag suggestions in a particular order as illustrated in FIG. 3.

Finally and as illustrated, presentation engine 124 includes a tag-suggestion allocation tool 434 and a stop list 436. In some instances, the presentation engine employs tool 434 to reserve certain tag suggestion slots for tag suggestions that have not yet been associated with the particular item, as well as other slots for tags that have been so associated. For instance, a top six of the already-associated tags may be displayed as tag suggestions, while a top four of tag suggestions that have not been previously associated may also be displayed. In other instances, however, presentation engine 124 merely presents the top-ranked tag suggestions and/or tags already associated with the item.

Stop list 436, meanwhile, lists tags that should not be suggested for certain items. List 436 also lists, for the certain items, items from which tags should not be used as tag suggestions. For instance, stop list 436 may list, for a particular item such as a children's movie, certain tags that would be inappropriate for the particular item. In the example of the children's movie, list 436 may direct that certain tags relating to drugs or violence should be not be listed as tag suggestions. Presentation engine 124 may accordingly disregard any of these stopped tag suggestions.

In addition, stop list 436 may determine that certain items are complementary to a particular item. As such, stop list 436 may direct presentation engine 124 to disregard any tags pulled from those certain items. Conversely, stop list 436 may direct related item engine 126 to disregard these items that would otherwise be considered related. For instance, imagine that a digital camera is related to a memory card within item catalog 112. Here, the memory card may appear on the stop list 436 for the digital camera, such that tags associated with the memory card are not suggested for the digital camera. In many instances, the tags associated with the memory card (e.g. "50 Gigabytes", "Lightweight") may not make sense when applied as tag suggestions for the digital camera.

Operation

Figure 5:
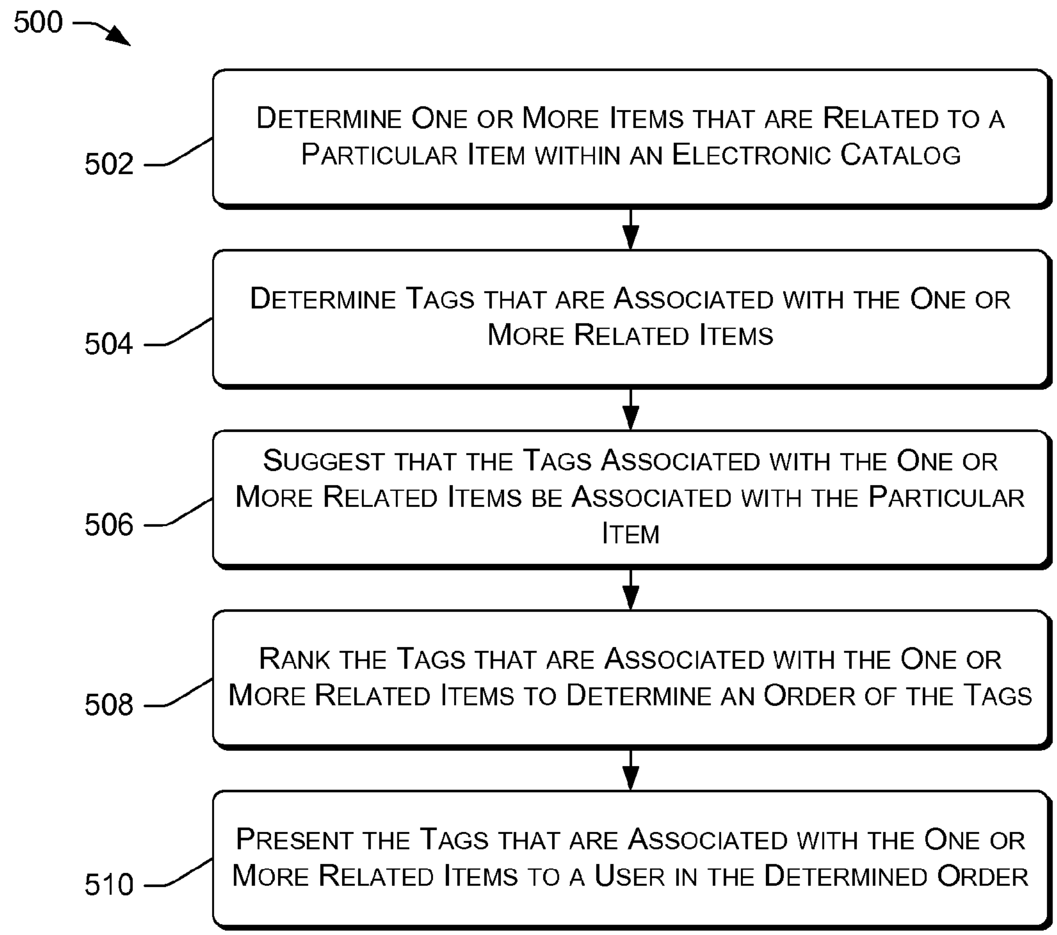
FIG. 5 is a flow diagrams of one embodiment of a process for determining one or more tag suggestions.

FIGS. 5 illustrates an illustrative process 500 for determining one or more tags to suggest as tags for association for a particular item within an electronic catalog. This process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 500 includes operation 502, which represents determining one or more items that are related to a particular item within an electronic catalog. At operation 504, tags that are associated with these one or more related items are then determined. At operation 506, meanwhile, the tags that are associated with the related items are suggested as tags for the particular item. Next, operation 508 ranks the tags that are associated with the one or more related items to determine an order of the tags. Finally, operation 510 presents the tags that are associated with the one or more related items to a user in the determined order.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of implementing an item catalog hosted by a merchant website, comprising:

under control of one or more computer systems configured with specific executable instructions, determining one or more items within the item catalog that are related to a particular item within the item catalog;

determining tags that users of the merchant website have previously associated with the one or more related items; and suggesting that the tags that are associated with the one or more related items be associated as tags with the particular item, wherein the suggesting includes:

assigning weights to the tags that are associated with the one or more related items based at least in part on a source of each of the tags and whether each of the tags was already associated with the particular item;

ranking the tags that are associated with the one or more related items based at least in part on the assigned weights; and presenting at least a portion of the tags that are associated with the one or more related items to a user of the merchant website based, at least in part, on the ranking to enable the user of the merchant website to associate one or more of the tags with the particular item.

2. A method comprising:

under control of one or more computer systems configured with specific executable instructions, determining one or more items that are related to a particular item within an electronic catalog;

determining tags that are associated with the one or more related items;

assigning weights to the tags that are associated with the one or more related items based at least in part on whether each of the tags was already associated with the particular item;

ranking the tags that are associated with the one or more related items based at least in part on the assigned weights; and suggesting that one or more of the tags associated with the one or more related items be associated with the particular item based at least in part on the rankings of the tags.

3. A method as recited in claim 2, wherein the one or more related items and the particular item comprise items for sale on a merchant website.

4. A method as recited in claim 2, wherein the tags that are associated with the one or more related items have been associated by users of a merchant web site.

5. A method as recited in claim 2, wherein the determining of the one or more related items comprises determining, for users that purchased the particular item, which other items within the electronic catalog the users also purchased.

6. A method as recited in claim 2, wherein the determining of the one or more related items comprises determining, for users that viewed the particular item within the electronic catalog during a particular session, which other items within the electronic catalog the users also viewed during the particular session.

7. A method as recited in claim 2, wherein the determining of the one or more related items comprises:

determining metadata about the particular item; and searching the electronic catalog for other items that contain the determined metadata.

8. A method as recited in claim 2, wherein the determining of the one or more related items comprises:

determining a particular tag that has been associated with the particular item; and searching the electronic catalog for other items that have also been associated with the particular tag.

9. A method as recited in claim 2, wherein the determining of the one or more related items comprises determining items within a same category of the electronic catalog as the particular item.

10. A method as recited in claim 2, wherein the determining of the one or more related items comprises examining customer-created lists that include the particular item to determine other items that the customer-created lists also include.

11. A method as recited in claim 2, wherein the determining of the one or more related items comprises:

examining a corpus of text associated with the particular item to determine a statistically improbable phrase within the corpus; and examining corpuses of texts associated with other items in the electronic catalog to determine other corpuses that also include the statistically improbable phrase.

12. A method as recited in claim 2, wherein the determining of the one or more related items comprises:

examining a corpus of text associated with the particular item to determine a statistically improbable phrase within the corpus;

determining one or more tags related to the statistically improbable phrase; and examining corpuses of texts associated with other items in the electronic catalog to determine other corpuses that also include the statistically improbable phrase or a tag related to the statistically improbable phrase.

13. A method as recited in claim 2, wherein the determining of the one or more related items comprises:

examining a corpus of text associated with the particular item to determine a capitalized phrase that appears, within the corpus, more than a threshold number of times; and examining corpuses of texts associated with other items in the electronic catalog to determine other corpuses that also include the capitalized phrase more than the threshold number of times.

14. A method as recited in claim 2, wherein the determining of the one or more related items comprises:

examining a corpus of text associated with the particular item to determine a capitalized phrase that appears, within the corpus, more than a threshold number of times;

determining one or more tags related to the capitalized phrase; and examining corpuses of texts associated with other items in the electronic catalog to determine other corpuses that also include the capitalized phrase, or one of the one or more tags related to the capitalized phrase, more than the threshold number of times.

15. A method as recited in claim 2, wherein the determining of the one or more related items comprises examining user-created relationships that relate the particular item with other items in the electronic catalog.

16. A method as recited in claim 2, wherein the determining of the one or more related items comprises examining a customer or critic review of the particular item to determine one or more other items in the electronic catalog identified in the customer or critic review.

17. A method as recited in claim 2, wherein the suggesting comprises presenting the tags that are associated with the one or more related items to a user of a merchant website, and further comprising:

receiving a selection of the one or more tags from the user; and associating the one or more selected tags with the particular item responsive to the receiving of the selection.

18. A method as recited in claim 2, further comprising:

determining an order of the tags based at least in part on the ranking; and presenting the tags that are associated with the one or more related items to a user in the determined order.

19. A system comprising:

one or more processors;

memory, accessible by the one or more processors;

a related item engine stored in the memory and executable on the one or more processors to determine items that are related to a particular item;

determine, based on multiple sources, tags that have been associated with the related items to enable suggesting that the tags be associated with the particular item; and a ranking engine stored in the memory and executable on the one or more processors to weight each of the tags based at least in part a respective source of the tag and to rank the tags based at least in part on the weighting.

20. A system as recited in claim 19, wherein the ranking engine is further configured to sum a number of times that the one or more tags have been associated with the related items; and further comprising a presentation engine to present, as tag suggestions for the particular item, the one or more tags that have been associated with the related items a highest number of times.

21. A system as recited in claim 19, wherein the ranking engine is further configured to determine a strength of a relationship between the particular item and each of the related items.

22. A system as recited in claim 19, wherein at least one of the weights is determined, at least in part, upon a category in an electronic catalog of the particular item.

23. A system as recited in claim 19, wherein the ranking engine is configured to rank the one or more tags by determining, for each of the tags: (1) a number of items in an electronic catalog that have been associated with the tag, or (2) a number of users that have used the tag.

24. A system as recited in claim 19, further comprising a presentation engine to present: (1) a set number of the one or more tags based on the ranking of the one or more tags, or (2) an ordered list of at least some of the one or more tags based on the ranking of the one or more tags.

* * * * *